(12) United States Patent
Townsend et al.

(10) Patent No.: US 11,579,655 B2
(45) Date of Patent: Feb. 14, 2023

(54) DISPLAY LIFTING MECHANISMS

(71) Applicant: Hewlett-Packard Development Company, L.P., Spring, TX (US)

(72) Inventors: Marcus Townsend, Spring, TX (US); Ilchan Lee, Spring, TX (US); Jin Sang Hwang, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 119 days.

(21) Appl. No.: 17/047,231

(22) PCT Filed: Jun. 13, 2018

(86) PCT No.: PCT/US2018/037293
§ 371 (c)(1),
(2) Date: Oct. 13, 2020

(87) PCT Pub. No.: WO2019/240788
PCT Pub. Date: Dec. 19, 2019

(65) Prior Publication Data
US 2021/0165453 A1  Jun. 3, 2021

(51) Int. Cl.
*G06F 1/16* (2006.01)
(52) U.S. Cl.
CPC .......... *G06F 1/1647* (2013.01); *G06F 1/1616* (2013.01); *G06F 1/1681* (2013.01)
(58) Field of Classification Search
CPC .... G06F 1/1647; G06F 1/1616; G06F 1/1681; G06F 1/1667; G06F 1/166; G06F 1/165
See application file for complete search history.

(56) References Cited

U.S. PATENT DOCUMENTS

| | | | | |
|---|---|---|---|---|
| 5,534,891 A * | 7/1996 | Takano | ............... | G06F 1/1666 |
| | | | | 345/169 |
| 6,008,986 A | 12/1999 | Mok | | |
| 6,028,768 A * | 2/2000 | Cipolla | ............... | G06F 1/203 |
| | | | | 361/679.46 |
| 7,894,184 B2 | 2/2011 | Huang et al. | | |
| 8,520,382 B2 * | 8/2013 | Tye | ............... | G06F 1/203 |
| | | | | 248/688 |

(Continued)

FOREIGN PATENT DOCUMENTS

| | | |
|---|---|---|
| CN | 204347767 | 5/2015 |
| CN | 102902358 | 1/2016 |

(Continued)

OTHER PUBLICATIONS

ASUS PRO B9440, ASUS Global, Apr. 6, 2018, 19 pgs, https://www.asus.com/Commercial-Laptops/ASUSPRO-B9440UA/.

*Primary Examiner* — James Wu
(74) *Attorney, Agent, or Firm* — Knobbe, Martens, Olson & Bear, LLP

(57) ABSTRACT

In example implementations, an electronic device housing is provided. The electronic device housing includes a display housing, a lifting mechanism, a base housing, and a secondary display. The lifting mechanism is coupled to a side of the display housing. The base housing is coupled to the display housing. The secondary display is coupled to a distal side of the base housing. The lifting mechanism is to lift the secondary display on a rotation of the display housing.

9 Claims, 4 Drawing Sheets

(56) References Cited

U.S. PATENT DOCUMENTS

| | | |
|---|---|---|
| 8,542,486 B2 | 9/2013 | Lin et al. |
| 9,501,097 B2 | 11/2016 | Moser |
| 2004/0108968 A1 | 6/2004 | Finke-Anlauff et al. |
| 2006/0274490 A1 | 12/2006 | Cheng |
| 2011/0023272 A1 | 2/2011 | Huang |
| 2012/0127652 A1* | 5/2012 | Lin ................ H01L 23/467 |
| | | 361/688 |
| 2018/0210504 A1* | 7/2018 | Moser ............... G06F 1/1679 |

FOREIGN PATENT DOCUMENTS

| | | |
|---|---|---|
| DE | 102005009655 | 9/2006 |
| TW | 201802637 | 1/2018 |
| WO | WO-2011067859 | 6/2011 |
| WO | 2012/075348 A1 | 6/2012 |

* cited by examiner

DISPLAY LIFTING MECHANISMS

BACKGROUND

Laptop computers are portable computing devices. The laptop computer provides the convenience of a full desktop computer, but packaged in a portable form factor that allows a user to travel with the laptop computer. The laptop computer may include a display and input/output devices combined into a single housing.

Laptop computers may have a clamshell design. For example, the display may be on a first half of the clamshell and the keyboard/touchpad may be on a second half of the clamshell that is opposite the first half. Thus, the user may close the laptop to protect the display and the keyboard or open the laptop to view the display and access the keyboard/touchpad.

DETAILED DESCRIPTION

Examples described herein provide a lift mechanism for laptop computers. As discussed above, laptop computers may have a clamshell design. When the laptop computer is opened, the bottom portion of the housing that includes the keyboard and many of the electrical components may rest on a surface (e.g., a table top or desk top). Due to the smaller design of the laptop computers and the limited amount of real estate, there may be a lack of cooling airflow to properly cool the electronic components. In addition, the demand for higher performance laptop computers is increasing.

Certain laptops may include a secondary screen on a portion of the "C" deck (e.g., a portion of a topside of the keyboard housing). However, when the secondary screen lies flat, the secondary screen may be difficult to view.

Examples herein provide a lifting mechanism that may lift a portion of the "C" deck of the laptop housing. As a result, more air may flow through the laptop from the back of the keyboard housing portion and out through the opening created when the portion of the "C" deck is lifted. The increased air flow may help to improve cooling of the electrical components within the keyboard housing portion of the laptop.

In addition, when a secondary screen is included in a portion of the "C" deck, lifting the portion of the "C" deck with the secondary screen may improve the viewing angle of the secondary screen. Thus, the lifting mechanism may help improve the user experience with the secondary screen.

Lastly, the lifting mechanism may help to improve sound performance of internal speakers of the laptop computer. For example, the internal speakers may be located below the portion of the "C" deck that is raised by the lifting mechanism. Lifting the portion of the "C" deck above where the speakers are located may allow more sound to escape to provide a fuller sound from the internal speakers.

Figure 1:
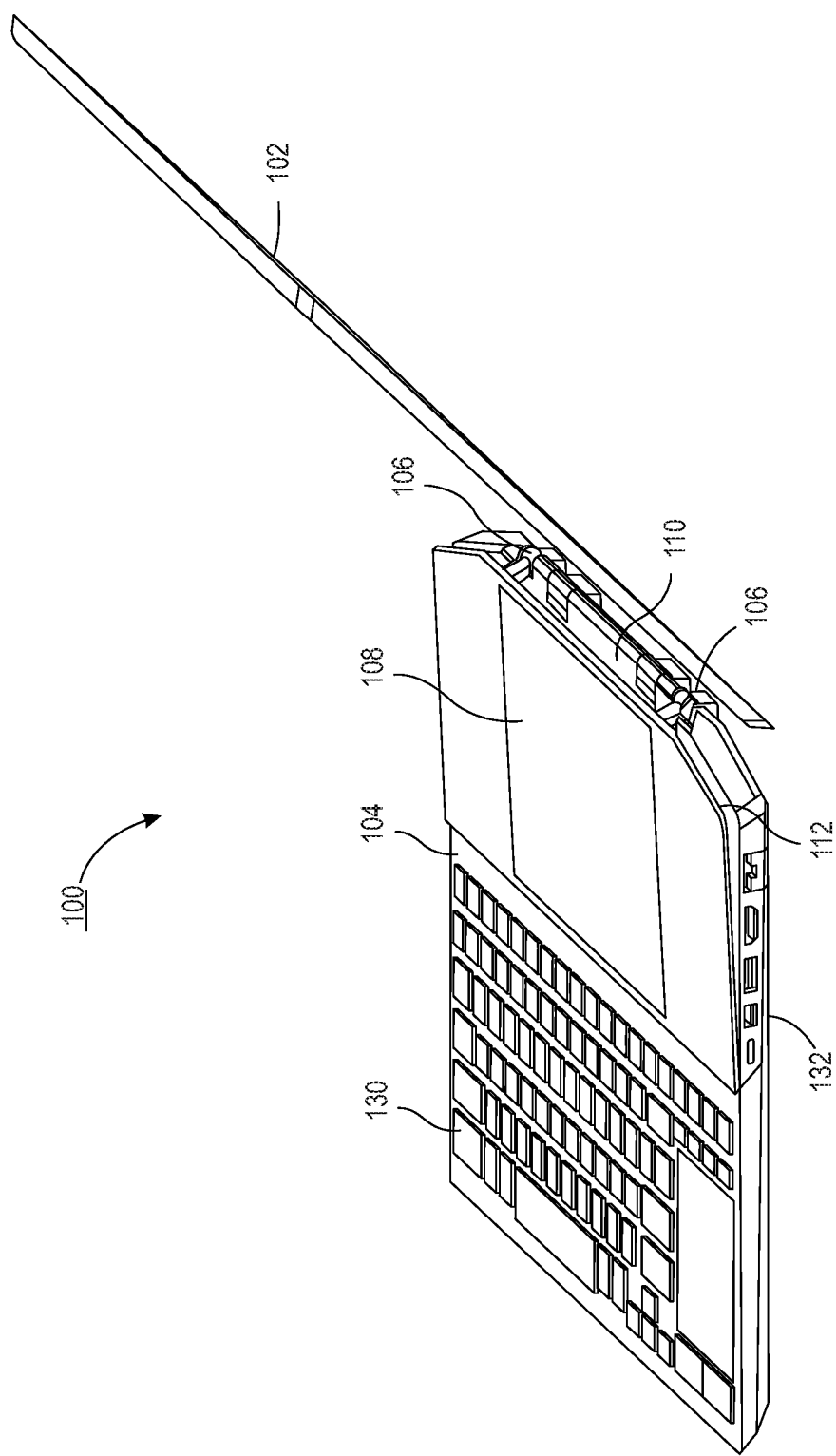
FIG. 1 is an isometric side view of an example electronic device housing with a lifting mechanism of the present disclosure in an open position.

FIG. 1 illustrates a block diagram of an electronic device 100 of the present disclosure having a lifting mechanism 106. FIG. 1 illustrates the electronic device 100 in an open position. The electronic device 100 may be a laptop computer.

The electronic device 100 may include a display housing 102 and a base housing 104. The display housing 102 may be coupled to the base housing 104 via the lifting mechanism 106. The display housing 102 may enclose a display (e.g., a light emitting diode (LED) display, a touch screen display, and the like). The display in the display housing 102 may server as the main or primary display.

In one example, the base housing 104 may include a keyboard 130, connection interfaces 132, and a secondary display 108. The base housing 104 may also enclose internal electronic components (e.g., a motherboard, a hard disk drive, a memory (e.g., random access memory (RAM)), a power supply, and the like) that are not shown.

In one example, the secondary display 108 may be coupled to a distal side of the base housing 104 and serve as a second display that works with the display in the display housing 102 or may work as an independent display. The secondary display 108 may have smaller dimensions than the display in the display housing 102.

FIG. 1 illustrates the secondary display 108 that is lifted by the lifting mechanism 106. The lifting mechanism 106 may lift the secondary display 108 from a side 112 (e.g., a bottom side) that is opposite the secondary display 108. For example, the lifting mechanism 106 may push the secondary display 108 upward from underneath the secondary display 108. Said another way, the lifting mechanism 106 may lift a portion of the "C" deck of the base housing 104 that includes the secondary display 108. Notably, the lifting mechanism 106 does not lift the entire base housing 104.

Lifting the secondary display 108 via the lifting mechanism 106 may improve the viewing angle of the secondary display 108. The improved viewing angle of the secondary display 108 may improve the overall user experience.

In addition, when the secondary display 108 is lifted, an opening 110 may be created between the base housing 104 and the secondary display 108. The opening 110 may provide improved cooling of the components inside of the base housing 104. For example, air may flow from a backside and bottom side of the base housing 104. The opening 110 may provide more volume for the air to exit. The greater air flow induced by the opening 110 may provide more efficient cooling of the internal electronic components.

The opening 110 may also improve sound performance of internal speakers (not shown) of the laptop computer. The internal speakers may be located in a portion of the base housing 104 that is below the secondary display 108. The opening 110 may allow more sound to escape the base housing to provide a fuller sound from the internal speakers.

In one example, the lifting mechanism 106 may be any type of mechanical system. A plurality of lifting mechanisms 106 may be deployed in the housing of the electronic device 100. For example, two lifting mechanisms 106 may be used to couple the display housing 102 to the base housing 104, as illustrated in FIG. 1. The two lifting mechanisms may be located on opposite ends along a width of the display housing 102.

The lifting mechanism 106 may provide a rotational coupling of the display housing 102 to the base housing 104. The lifting mechanism 106 may operate to lift the secondary display 108 as the display housing 102 is moved or rotated into an open position. In other words, the lifting mechanism 106 may operate to lift or close the secondary display 108 as a function of the movement of the display housing 102.

In one example, the lifting mechanism 106 may be independent of a coupling between the display housing 102 and the base housing 104. For example, a separate rotatable hinge may be deployed to couple the display housing 102 to the base housing 104. The rotatable hinge may allow the display housing 102 to open, while the lifting mechanism 106 lifts the secondary display 108.

In addition, the lifting mechanism 106 may be designed to ensure that the secondary display 108 does not begin lifting upwards until the display housing 104 is opened a pre-defined amount. Thus, the secondary display 108 may not be lifted too soon to run into the display housing 102.

In one example, the lifting mechanism 106 may be a single mechanical piece. A curved member may be coupled to the display housing 102 and the bottom side 112 of the secondary display 108. As the display housing 102 rotates to an open position, the movement of the display housing 102 may cause the curved member to push up, or lift, the secondary display 108 to a desired viewing angle. As the display housing 102 rotates to a closed position, the movement of the display housing 102 may cause the curved member to pull down, or close, the secondary display 108 to a flat position.

In some examples, the lifting mechanism 106 may be deployed as multiple mechanical pieces. FIGS. 2-7 illustrate different examples of the lifting mechanism 106 comprising multiple mechanical pieces and provide the design features described above. Although two examples of the lifting mechanism 106 are illustrated in FIGS. 2-7, it should be noted that other mechanical designs may provide the design features of the lifting mechanism 106 described above and be within the scope of the present disclosure.

Figure 2:
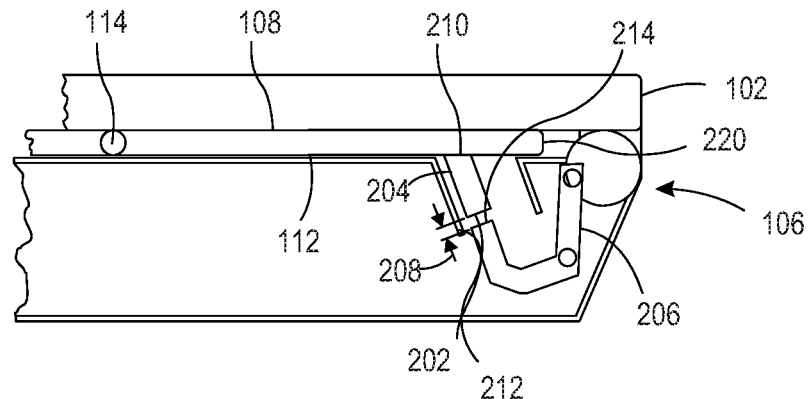
FIG. 2 is a side cross-sectional view of one example lifting mechanism in a closed position of the present disclosure.
Figure 3:
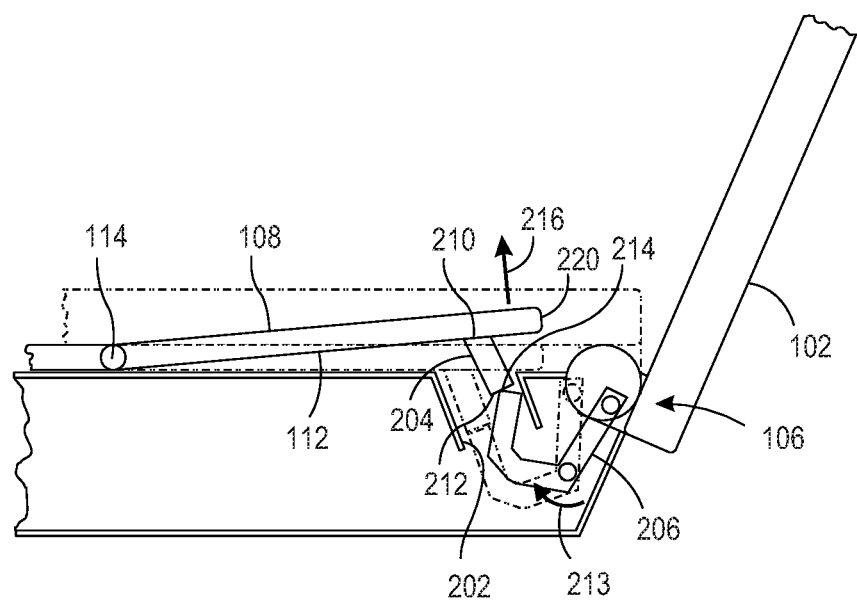
FIG. 3 is a side cross-sectional view of the example lifting mechanism in an open position of the present disclosure.

FIG. 2 illustrates a cross-sectional side view of an example lifting mechanism 106. FIG. 2 illustrates the secondary display 108 coupled to the base housing 104 via a rotatable hinge 114. The rotatable hinge 114 may allow the secondary display 108 to move upwards when lifted by the lifting mechanism 106. Although one lifting mechanism 106 is illustrated in FIGS. 2 and 3, it should be noted that there may be two lifting mechanisms deployed (e.g., one on each side of the secondary display 108).

In one example, the lifting mechanism 106 may include a slot 202, a movable member 204, and a rotating member 206. The movable member 204 may be movable coupled to the slot 202. The movable member 204 may move vertically (e.g., up and down) within the slot 202. For example, the slot 202 may include guide rails and the movable member 204 may be inserted into the guide rails of the slot 202.

In one example, a first end 210 of the movable member 204 may be coupled to or adjacent to a bottom side 112 of the secondary screen 108. A second end 212 of the movable member 204 may be located in proximity to the rotating member 206. In the example illustrated in FIG. 2, the proximity may be a predefined distance 208 between the second end 212 and an end 214 of the rotating member 206. The predefined distance 208 may be a function of an amount of movement, or rotation, of the rotating member 206 to allow the display housing 102 to clear an end 220 of the secondary display 108.

In one example, the rotating member 206 may be a curved hook or a J-shaped hook. The rotating member 206 may be coupled to the display housing 102. As the display housing 102 is opened, the end 214 of the rotating member 206 may engage the second end 212 of the movable member 204. As the display housing 102 continues to be rotated to a greater opened position or greater viewing angle, the end 214 of the rotating member 206 may continue to push the movable member 204 vertically up towards the secondary display 108. As a result, the first end 210 of the movable member 204 may push up the secondary display 108.

FIG. 3 illustrates a cross-sectional side view of an example of the display housing 102 in an open position with the secondary display 108 lifted upwards by the lifting mechanism 106. As noted above, the rotating member 206 may rotate as shown by an arrow 213 as the display housing 102 is opened. The display housing 102 may clear the end 220 of the secondary display 108. Once the display housing 102 clears the end 220 of the secondary display 108, the end 214 of the rotating member 206 may engage the second end 212 of the movable member 204. The movable member 204 may be pushed upwards as shown by an arrow 216 to lift the secondary display 108 from a bottom side 112.

In one example, the width of the slot 202 may be wide enough to accommodate the end 214 of the rotating member 206 as the end 214 is inserted further into the slot 202. In one example, the rotating member 206 may be comprised of a series of pieces coupled together by joints. As the end 214 is inserted further into the slot 202, the joints may allow the series of pieces to straighten out inside of the slot 202. The end 214 may then push the movable member 204 upwards through the slot 202 towards the bottom side 112 of the secondary display 108 and lift the secondary display 108.

In one example, when the display housing 102 is returned to a closed position (e.g., shown in FIG. 2), the end 214 of the rotating member 206 may exit the slot 202 and disengage the second end 212 of the movable member 204. As a result, the movable member 204 may fall vertically away from the bottom side 112 of the secondary display 108. When the first end 210 of the movable member 204 disengages from the bottom side 112 of the secondary display 108, the secondary display 108 may fall back into the base housing 104 in a closed, or flat, position (as illustrated in FIG. 2).

Figure 4:
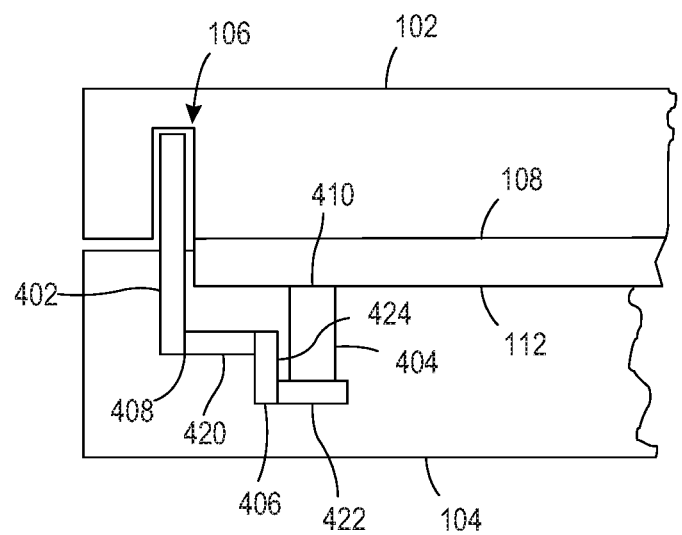
FIG. 4 is a front cross-sectional view of one example lifting mechanism in a closed position of the present disclosure.

FIG. 4 illustrates a cross-sectional front view of an example lifting mechanism 106. FIG. 4 illustrates the secondary display 108 may be coupled to the base housing 104 via a rotatable hinge (similar to the rotatable hinge 114 illustrated in FIGS. 2 and 3 above). The secondary display 108 may move against the rotatable hinge when lifted by the lifting mechanism 106.

In one example, the lifting mechanism 106 may include a rotating member 402, and an L-shaped member 404. The rotating member 402 may be coupled to an end of the display housing 102. For example, the rotating member 402 may be coupled to an end of the display housing 102 that is adjacent to the distal end of the base housing 104 wherein the secondary display 108 is located.

The L-shaped member 404 may include a first end 410 and a second end 408. The first end 410 may be coupled to, or abut against, the bottom side 112 of the secondary display 108. The second end 408 may be coupled to an end of the rotating member 402.

A portion 406 of the L-shaped member 404 having the second end 408 may include an irregular shape. For example, the portion 406 may have segments 420 and 422 that are rotatably coupled to one another. The segments 420 and 422 may be positioned on opposite ends of a coupling plate 424. Thus, the segment 420 may be positioned higher than the segment 422 when the display housing 102 is in a closed position.

Figure 5:
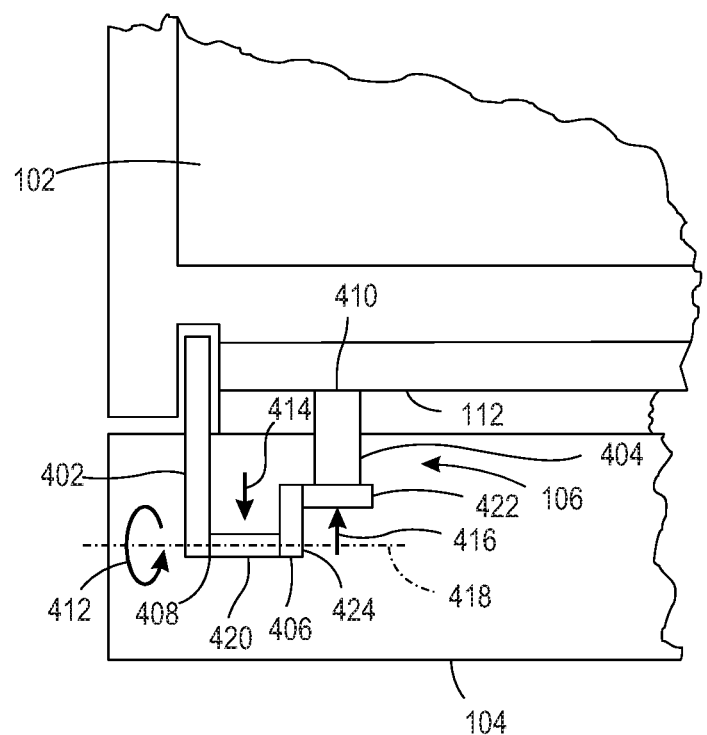
FIG. 5 is a front cross-sectional view of the example lifting mechanism in an open position of the present disclosure.

FIG. 5 illustrates the display housing 102 in an open position. As the display housing 102 is opened and the rotating member 402 may rotate around an axis 418. The movement of the rotating member 402 may cause the segment 420 to move downward as shown by an arrow 414. At the same time, the segment 422 may move upward as shown by an arrow 416. As the segment 422 moves upward, the first end 410 of the L-shaped member 404 may press against the bottom side 112 of the secondary display 108 to lift the secondary display 108, as shown in FIG. 5.

In other words, the design of the example lifting mechanism 106 in FIGS. 4 and 5 may translate rotational motion into linear motion. The rotating member 402 and the L-shaped member 404 may work together and move similar to a mechanical piston.

In one example, the length of the rotating member 402 may be a function of an amount of rotation to allow the display housing 102 to clear an end of the secondary display 108, as shown in FIGS. 2 and 3 and discussed above. For example, a gap may be provided between the first end 410 of the L-shaped member 404 and the bottom side 112 of the secondary display 108. The length of the rotating member 402 may be such that the first end 410 of the L-shaped member 404 engages the bottom side 112 after the display housing 102 has cleared an end of the secondary display 108.

In one example, when the display housing 102 is closed, the rotating member 402 may rotate in a direction opposite to the arrow 412 around the axis 418. As a result, the segment 420 may move higher than the segment 422. As the segment 422 is lowered, the first end 410 of the L-shaped member 404 may disengage from the secondary display 108 to allow the secondary display 108 to return to a closed, or flat position, as shown in FIG. 4. In another example, if the first end 410 of the L-shaped member 404 is coupled to the bottom side 112 of the secondary display 108, the L-shaped member 404 may pull the secondary display 108 downward into the closed, or flat position.

Figure 6:
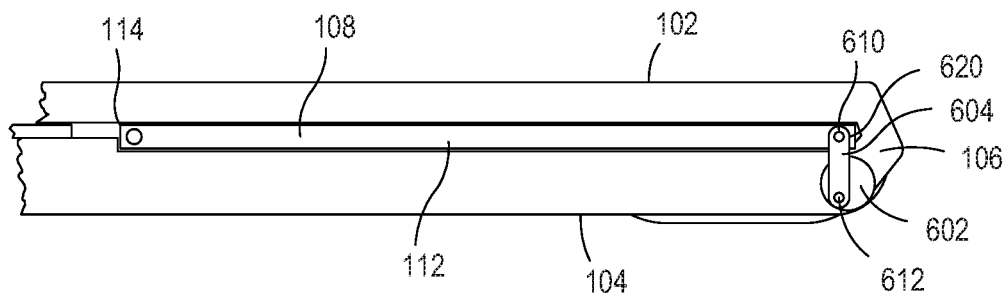
FIG. 6 is a side cross-sectional view of one example lifting mechanism in a closed position of the present disclosure.

FIG. 6 illustrates a cross-sectional side view of an example lifting mechanism 106 in a closed position. FIG. 6 illustrates the secondary display 108 coupled to the base housing 104 via a rotatable hinge 114. The rotatable hinge 114 may allow the secondary display 108 to move upwards when lifted by the lifting mechanism 106. Although one lifting mechanism 106 is illustrated in FIGS. 6 and 7, it should be noted that there may be two lifting mechanisms 106 deployed (e.g., one on each side of the secondary display 108).

In one example, the lifting mechanism 106 may include a movable member 604 and a rotating member 602. A first end 610 of the movable member 604 may be adjacent to an end 620 of the secondary display 108 that is opposite the hinge 114. In one example, the first end 610 of the movable member 604 may be rotatably coupled to the outer sides of the end 620 of the secondary display 108 that is opposite the hinge 114. A second end 612 of the movable member 604 may be rotatably coupled to the rotating member 602. In one example, the second end 612 of the movable member 604 may be coupled to an outer portion (e.g., near the outer edge) of the rotating member 602.

In one example, as the display housing 102 is rotated into an open position, the rotating member 602 may also rotate. The rotation of the rotating member 602 may cause the movable member 604 to also move in a vertical direction. The movable member 604 may lift the secondary display 108 to a desired viewing angle as the movable member 604 is moved in the vertical direction.

Figure 7:
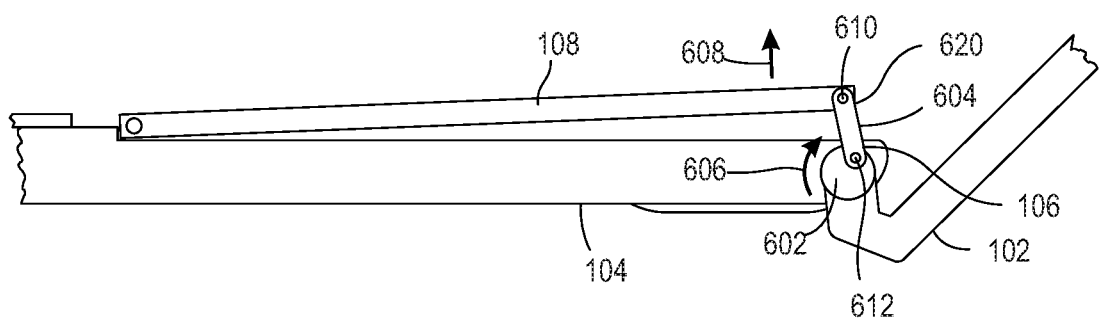
FIG. 7 is a side cross-sectional view of the example lifting mechanism in an open position of the present disclosure.

FIG. 7 illustrates a cross-sectional side view of the example lifting mechanism 106 in an open position. As noted above, the rotating member 602 may rotate as shown by an arrow 606 as the display housing 102 is opened. The display housing 102 may clear the end 620 of the secondary display 108. Once the display housing 102 clears the end 620 of the secondary display 108, the movable member 604 may lift the secondary display 108 upwards, in a direction as shown by an arrow 608.

In one example, the starting position of the second end 612 of the movable member 604 and the diameter of the rotating member 602 may be based on when the display housing 102 clears the end 620 of the secondary display 108. In other words, the diameter of the rotating member 602 may be large enough such that the rotation of the rotating member 602 does not allow the movable member 604 to lift the secondary display 108 until the display housing 102 has cleared the end 620 of the secondary display 108.

In one example, when the display housing 102 is returned to the closed position illustrated in FIG. 6, the rotating member 602 may rotate in an opposite direction. The rotation of the rotating member 602 may cause the movable member 604 to move downwards and pull the secondary display 108 into a closed or flat position. Thus, the design of the lifting mechanism 106 in FIGS. 6 and 7 may also translate rotational movement into a linear movement to move the secondary display 108.

Although a few different examples of the lifting mechanism 106 are illustrated in FIGS. 2-7, it should be noted that other designs of the lifting mechanism 106 are within the scope of the present disclosure. As noted above, any design of the lifting mechanism 106 that can lift the secondary display 108 and ensure that the secondary display 108 does not begin rising upwards until the display housing 104 is opened a predefined amount (e.g., past the end of the secondary display 108) may be used.

As a result, the present disclosure provides an electronic device with a lifting mechanism that may lift a secondary display of the electronic device. The lifting mechanism may have a variety of different designs as disclosed by the examples described herein. Lifting the secondary display of the electronic device may provide an improved viewing angle of the secondary display and create an opening between the base housing and the secondary display. The opening may provide improved air flow, which may provide more efficient cooling of the components located inside of the base housing of the electronic device. In addition, the opening may improve speaker performance for speakers located inside of the base housing.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An electronic device housing, comprising:
   a display housing;

a lifting mechanism coupled to a side of the display housing;

a base housing coupled to the display housing; and a secondary display coupled to a distal side of the base housing, wherein the lifting mechanism is to lift the secondary display based on a rotation of the display housing, wherein the lifting mechanism comprises:

a rotating member; and a movable member, wherein a first end of the movable member is adjacent to a bottom side of the secondary display and a second end of the movable member is located in proximity to an end of the rotating member, wherein the end of the rotating member is to engage the second end of the movable member to lift the distal side of the base housing with the secondary display from a bottom side of the secondary display once the display housing clears an end of the secondary display, wherein the lifting mechanism further comprises:

a slot comprising an opening formed by walls that protrude from a top side of the base housing into the base housing to guide movement of the movable member within the slot.

2. The electronic device housing of claim 1, wherein the lifting mechanism comprises a plurality of lifting mechanisms located on opposite ends on the side of the display housing.

3. The electronic device housing of claim 1, wherein an end of the portion of the distal side of the base housing comprises a rotatable hinge to allow movement of the secondary display.

4. The electronic device housing of claim 1, wherein the rotating member comprises a curved hook, wherein the second end of the movable member is located in a slot and an end of the curved hook is aligned with the second end of the movable member to move the movable member vertically in the slot.

5. The electronic device housing of claim 4, wherein the proximity comprises a pre-defined distance such that the end of the lifting mechanism contacts the second end of the movable member after the display housing is rotated a pre-defined amount.

6. The electronic device of claim 1, wherein the rotating member is located below the movable member when the display housing is closed.

7. The electronic device of claim 1, wherein the rotating member enters the slot when the display housing is opened and exits the slot when the display housing is closed.

8. A lifting mechanism, comprising:

a J-shaped hook coupled to an end of a display housing;

a slot coupled to an inside portion of a base housing, wherein the slot comprises an opening formed by walls that protrude from a top side of the base housing; and a vertically moving member located in the slot, wherein movement of the vertically moving member within the slot is guided by the walls that form the opening, wherein a first end of the vertically moving member is coupled to an end of a distal side of the base housing having a secondary display and a second end of the vertically moving member is located above the J-shaped hook when the display housing is in a closed position, wherein rotation of the J-shaped hook in an opening direction is to cause the vertically moving member to lift the distal side of the base housing from a bottom side of the base housing when the end of the J-shaped hook is engaged with the second end of the vertically moving member once the display housing clears an end of the secondary display.

9. The lifting mechanism of claim 8, wherein rotation of the J-shaped hook in a closing direction is to cause the vertically moving member to fall and lower the distal side of the base housing.

* * * * *